US006719343B2

(12) United States Patent  
Emerling et al.

(10) Patent No.: US 6,719,343 B2  
(45) Date of Patent: Apr. 13, 2004

(54) VEHICLE CONSOLE ASSEMBLY

(75) Inventors: David M. Emerling, West Bloomfield, MI (US); Bruce F. Brewster, Northville, MI (US); Joseph P. Taylor, Kimball, MI (US); Steven M. Kowalski, Royal Oak, MI (US); Erin Daly, Oak Parks, MI (US); Jason Whitman, Canton, MI (US); Thomas S. Hicks, Livonia, MI (US); John Sumbera, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/104,156

(22) Filed: Mar. 22, 2002

(65) Prior Publication Data

US 2002/0163215 A1 Nov. 7, 2002

Related U.S. Application Data

(60) Provisional application No. 60/278,058, filed on Mar. 22, 2001.

(51) Int. Cl.⁷ .............................. B60R 7/04; B60R 11/02
(52) U.S. Cl. ..................... 296/24.1; 296/37.8; 224/539; 224/555
(58) Field of Search ............................... 296/24.1, 37.1, 296/37.5, 37.8, 37.14; 224/542, 539, 548, 555, 556

(56) References Cited

U.S. PATENT DOCUMENTS

| 4,279,503 | A | | 7/1981 | Cocco et al. | |
|---|---|---|---|---|---|
| 4,809,897 | A | * | 3/1989 | Wright, Jr. | 224/539 |
| 4,982,996 | A | | 1/1991 | Vottero-Fin et al. | |
| 5,177,616 | A | | 1/1993 | Riday | |
| 5,179,447 | A | | 1/1993 | Lain | |
| 5,338,081 | A | | 8/1994 | Young et al. | |
| 5,397,160 | A | | 3/1995 | Landry | |
| 5,507,556 | A | | 4/1996 | Dixon | |
| 5,547,248 | A | | 8/1996 | Marechal | |
| 5,556,017 | A | * | 9/1996 | Troy | 224/548 |
| 5,609,382 | A | | 3/1997 | Schmid et al. | |
| 5,823,599 | A | * | 10/1998 | Gray | 296/37.8 |
| 5,836,496 | A | * | 11/1998 | Levin et al. | 224/539 |
| 5,839,713 | A | | 11/1998 | Wright | |
| 5,850,997 | A | | 12/1998 | Rosen | |
| 5,996,954 | A | | 12/1999 | Rosen et al. | |
| 6,007,036 | A | | 12/1999 | Rosen | |
| 6,039,141 | A | * | 3/2000 | Denny | 180/329 |
| 6,059,358 | A | | 5/2000 | Demick et al. | |
| 6,086,129 | A | * | 7/2000 | Gray | 296/37.8 |
| 6,092,705 | A | | 7/2000 | Meritt | |

(List continued on next page.)

OTHER PUBLICATIONS

Sales Website @ "Atthemart.com," Mar. 6, 2002, ID=518&CATID=13, in color.  
Sales Website @ "Atthemart.com," Mar. 6, 2002, ID=521&CATID=36, in color.

Primary Examiner—D. Glenn Dayoan  
Assistant Examiner—H Gutman  
(74) Attorney, Agent, or Firm—Bill C. Panagos

(57) ABSTRACT

A console assembly for a vehicle including a video entertainment system includes a console housing having a storage compartment and a storage compartment closeout section pivotally connected to the console housing positionable between a raised position and a lowered position. An armrest is pivotally connected to the closeout section and is positionable between a closed position disposed adjacent the closeout section and an open position allowing access to a video monitor and monitor mount stored below. A video monitor mount pivotally connects the video monitor to the console assembly and allows for selective adjustment of the video monitor so that the screen is visible to rear seat occupants in the vehicle.

30 Claims, 12 Drawing Sheets

U.S. PATENT DOCUMENTS

| | | | |
|---|---|---|---|
| 6,129,400 A | * 10/2000 | Jakubiec et al. | 296/37.14 |
| 6,152,514 A | 11/2000 | McLellen | |
| 6,158,795 A | 12/2000 | Gray et al. | |
| 6,179,263 B1 | 1/2001 | Rosen et al. | |
| 6,186,459 B1 | * 2/2001 | Ma | 296/37.8 |
| 6,199,948 B1 | 3/2001 | Bush et al. | |
| 6,278,676 B1 | * 8/2001 | Anderson et al. | 296/37.8 |
| 6,338,429 B1 | * 1/2002 | Pesce | 224/539 |
| 6,361,012 B1 | * 3/2002 | Chang | 296/37.8 |
| 6,364,390 B1 | * 4/2002 | Finneman | 296/37.8 |
| 6,409,242 B1 | * 6/2002 | Chang | 296/24.1 |
| 6,419,314 B1 | * 7/2002 | Scheerhorn | 296/37.8 |
| 6,422,440 B1 | * 7/2002 | Stone | 224/539 |
| 6,494,527 B1 | * 12/2002 | Bischoff | 296/208 |

* cited by examiner

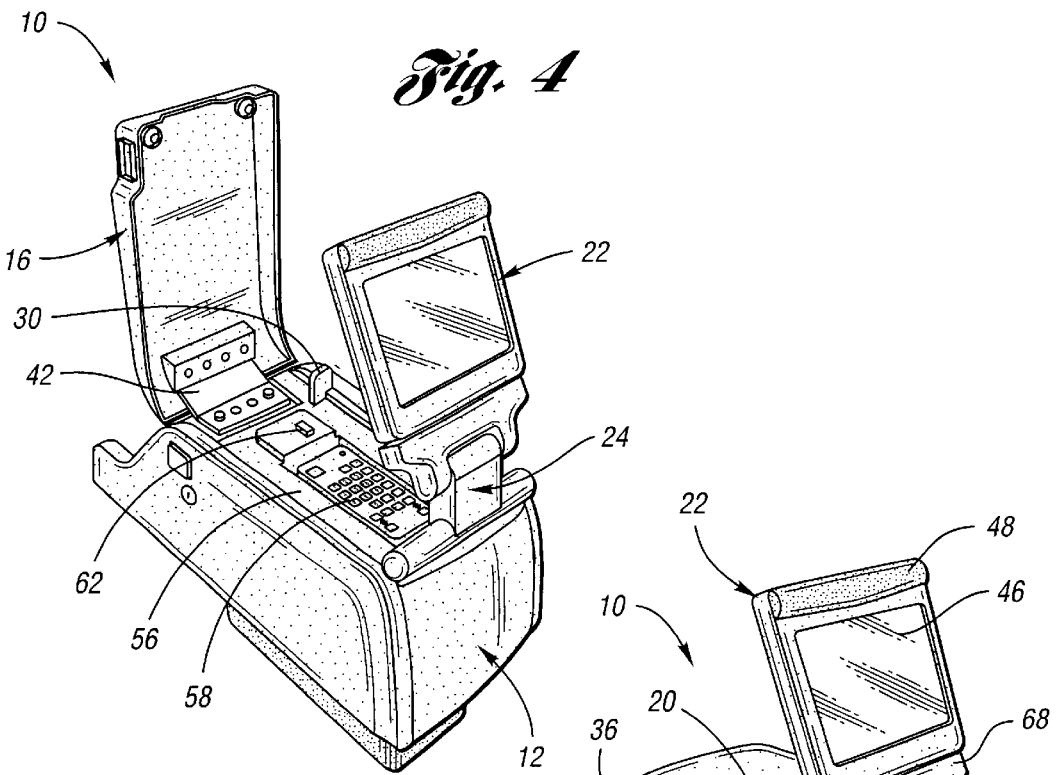
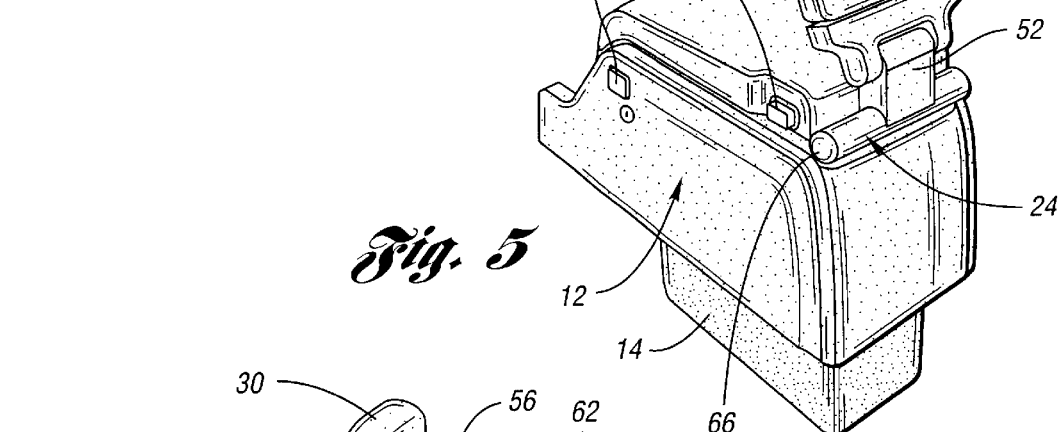
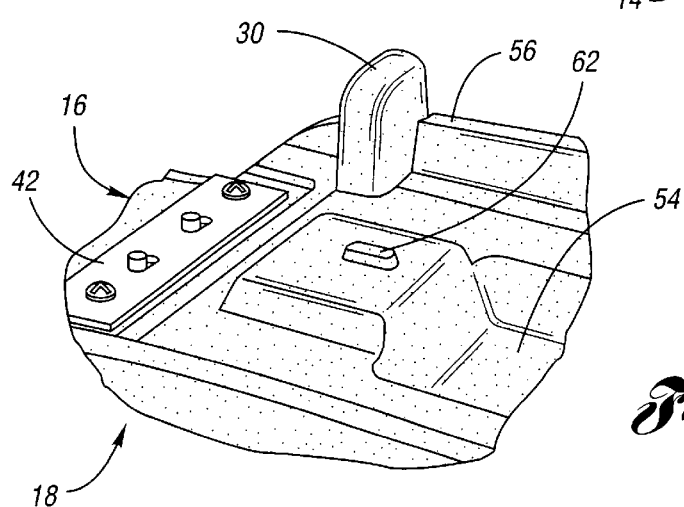

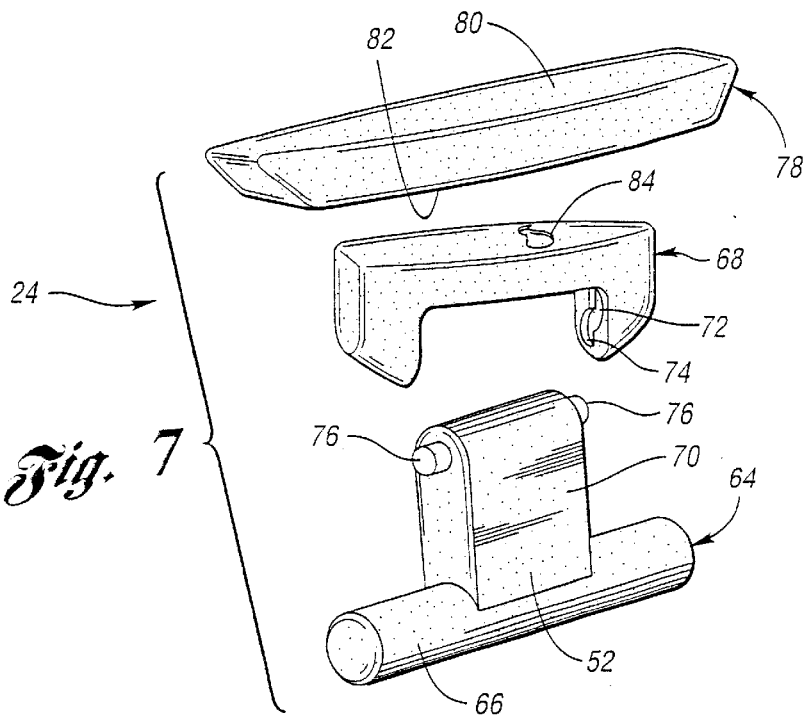
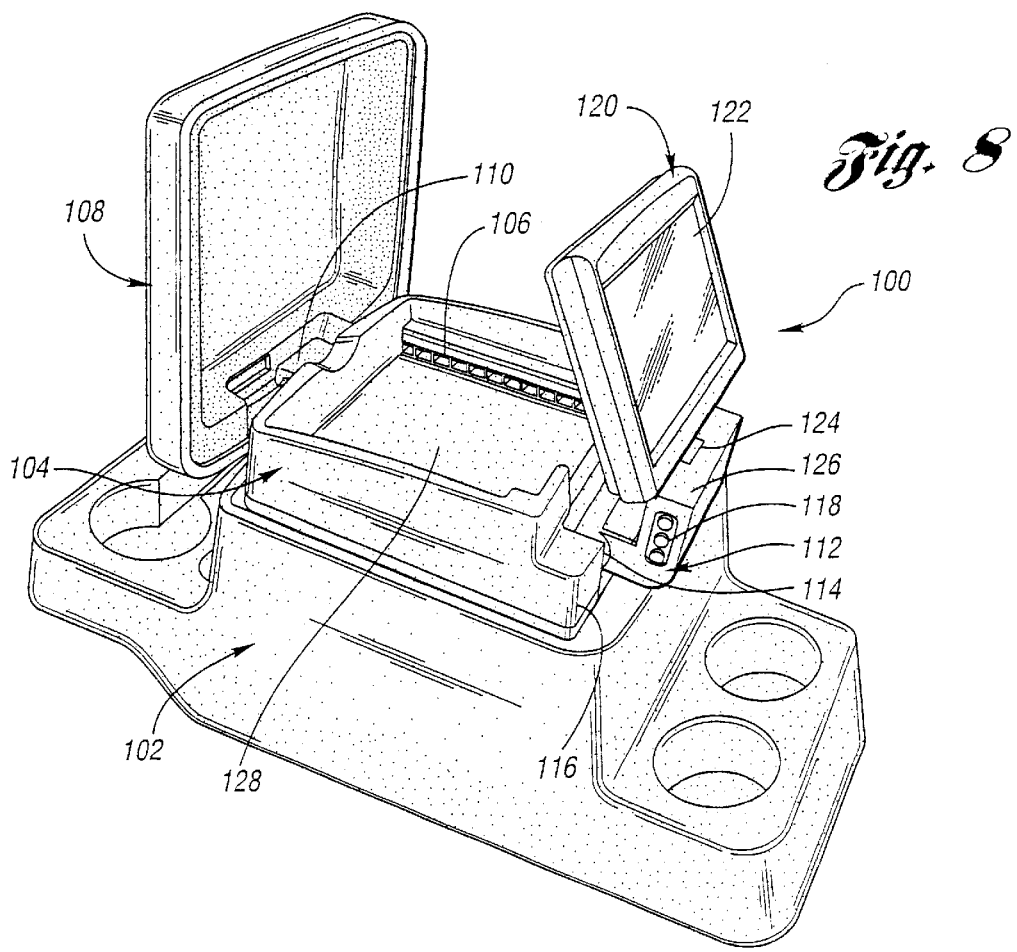

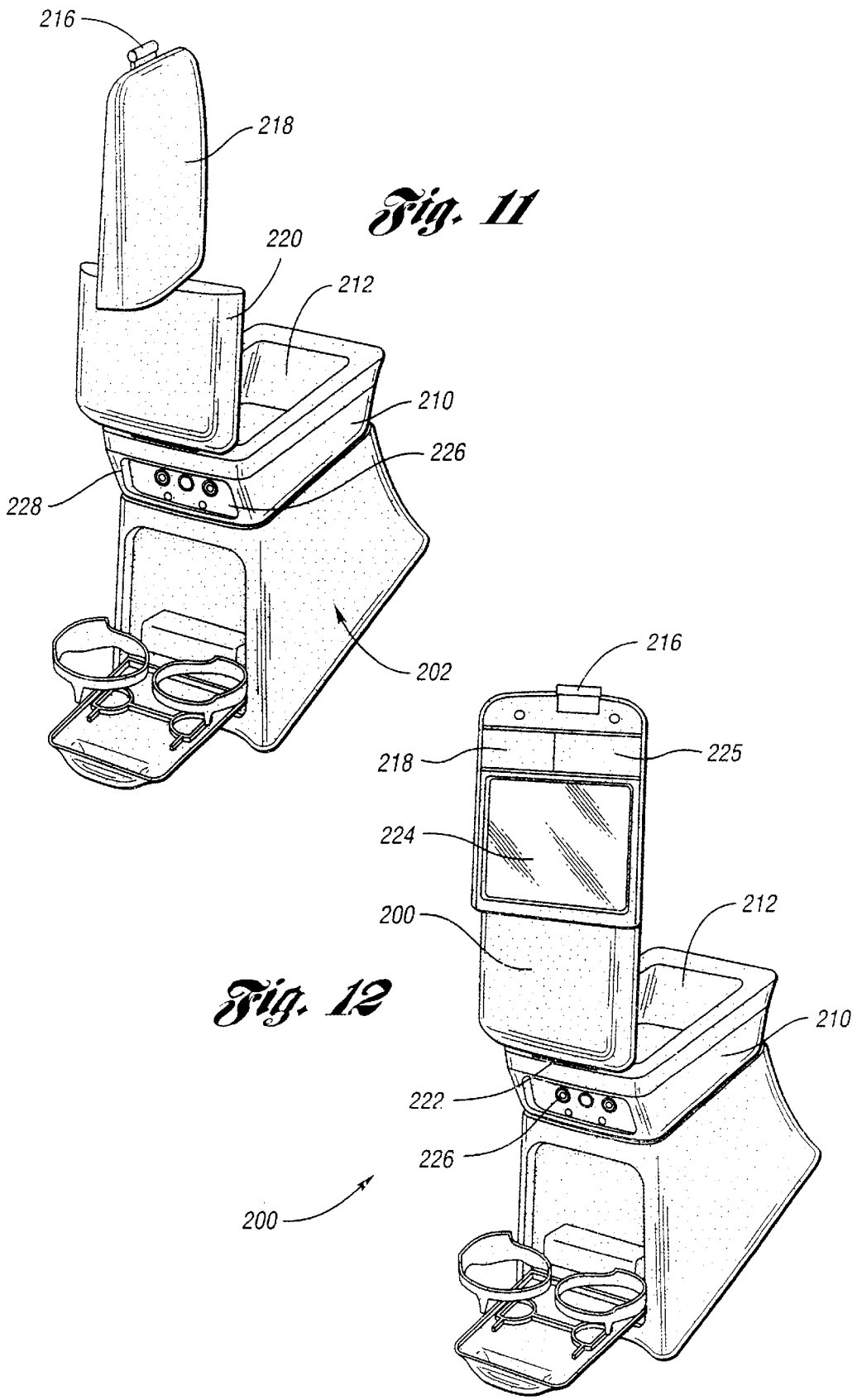

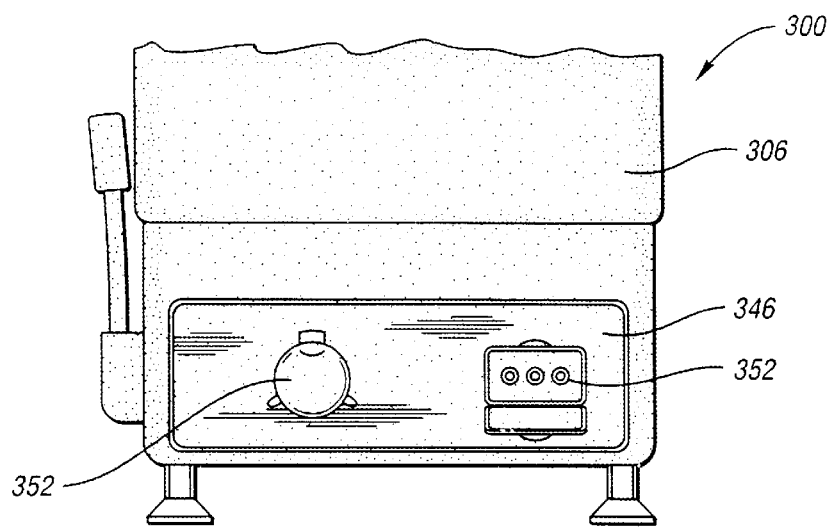
Fig. 23
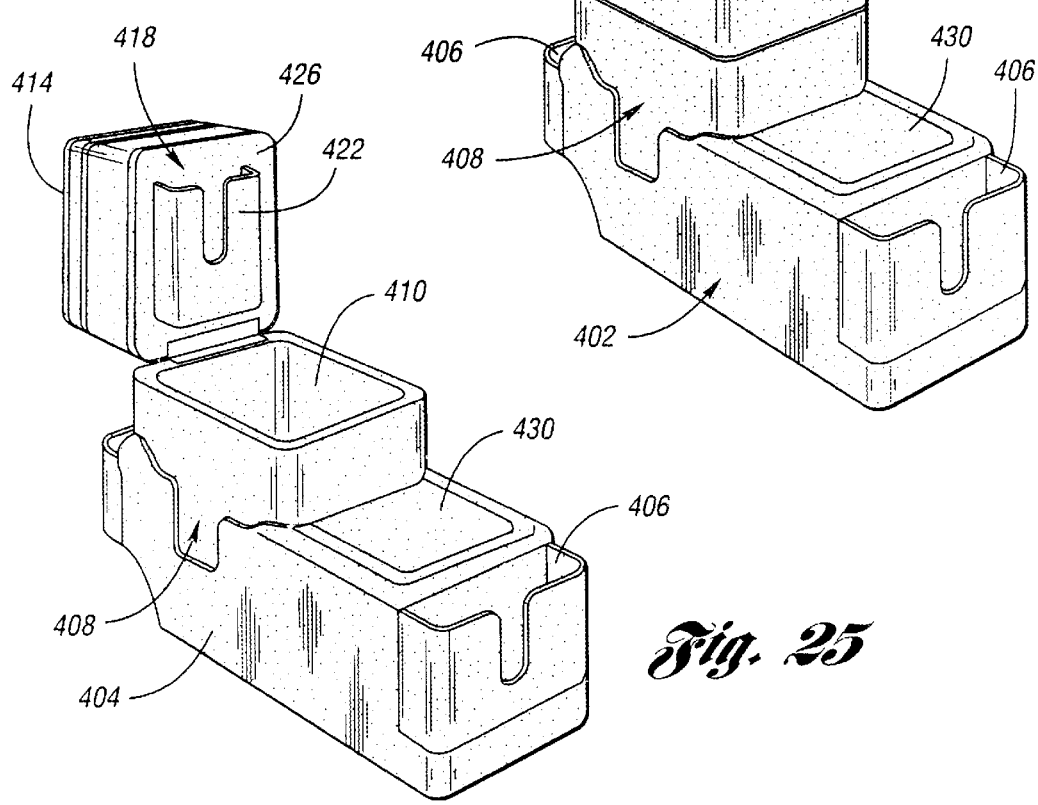
Fig. 25

VEHICLE CONSOLE ASSEMBLY

CROSS-REFERENCE TO RELATED APPLICATIONS

This application claims the benefit of U.S. provisional application Serial No. 60/278,058 filed Mar. 22, 2001.

BACKGROUND OF THE INVENTION

1. Field of the Invention

This invention relates to a console assembly incorporating a video entertainment system for a vehicle.

2. Background Art

Many automotive vehicles include a center console or other storage device disposed between the driver and passenger seats in the front passenger compartment of the vehicle. These consoles typically comprise a console base either secured to the floor or pivotally connected between the seats, a storage cavity formed in the console base to retain items during travel and an armrest pivotally connected to the console base extending generally horizontally across the storage cavity.

In recent years, vehicle manufacturers as well as aftermarket suppliers have answered consumer demand for entertainment systems in vehicles. These audio/video systems are designed to provide entertainment for passengers in the rear seating areas of the vehicle. One type of vehicle video entertainment system comprises a portable video player secured to the headrests of the driver and passenger seats to hang between the seats adjacent an existing vehicle floor console. This type of video player clutters the passenger compartment area and cannot be easily adjusted by the passengers to a variety of viewing positions.

Another type of video entertainment system comprises a center console secured to the floor between the front seats of a vehicle having a fixed video monitor disposed within the storage area of the console. The monitor is viewable by passengers in the rear seating area through a passage formed in the rear of the floor console. This video monitor arrangement dramatically reduces the amount of storage area available in the floor console.

Most video entertainment systems deployed in the passenger compartments of vehicles do not include freely positionable video monitor screens. Video monitors are susceptible to undesired glare from sunlight entering through the windows of the vehicle, which can obstruct a passenger's view of the video monitor. Additionally, a fixed monitor position may cause passengers to suffer from "motion" sickness generated by the improper sight lines of the monitor.

It is desirable to provide a vehicle console assembly incorporating a video entertainment system which increases the storage area of the console. It is also desirable to provide a video entertainment system having a monitor mounting arrangement which can be adjusted to a variety of viewing positions to accommodate various sight lines of passengers in the vehicle.

SUMMARY OF THE INVENTION

The present invention addresses the above-reference problems associated with prior vehicle console assemblies by providing a console assembly for a vehicle incorporating a video entertainment system. In one embodiment of the invention, the console assembly is disposed between a pair of passenger seats and is securable to a vehicle floor. In another embodiment of the invention, the console assembly is incorporated in a center seat having a seat bottom and a seat back pivotally connected to the seat bottom disposed between a pair of passenger seats.

The console assembly includes a console housing having a storage compartment formed therein. A storage compartment closeout section is pivotally connected to the console housing and is positionable between a closed position wherein the closeout section is at least partially disposed adjacent the storage compartment and an open position.

An armrest is pivotally connected to the closeout section and is positionable between a closed position disposed adjacent the closeout section and an open position allowing access to a video monitor disposed within a cavity in the closeout section. The video monitor is pivotally connected to the closeout section by a video monitor mount. The video monitor mount includes a lower portion pivotally secured to the closeout section and an upper portion receiving the video monitor. The video monitor mount is positionable between a stored position, wherein the video monitor is disposed in the closeout section, and a deployed position, wherein the monitor is pivoted upward to a deployed position so that the video monitor is visible to rear seat occupants in a vehicle.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 4 is a perspective view of the console assembly with the video monitor in a deployed position;

FIG. 5 is a partial perspective view of the storage area closeout of the console assembly;

FIG. 6 is a perspective view of a passive switch and remote cavity storage area in storage area closeout of the console assembly;

FIG. 7 is an exploded perspective view of a first mounting arrangement for the video monitor;

FIG. 8 is a perspective view of a second embodiment of the console assembly of the present invention;

FIG. 11 is a perspective view showing a video monitor positioned between a stored position and a deployed position;

FIG. 12 is a perspective view showing the video monitor in the deployed position;

FIG. 23 is perspective view of video ports provided in a rear portion of the console seat bottom;

FIG. 24 is a perspective view of a floor console assembly in accordance with the present invention;

FIG. 25 is a perspective view showing the armrest pivoted upward exposing the console storage area;

DETAILED DESCRIPTION OF THE PREFERRED EMBODIMENT(S)

Figure 1:
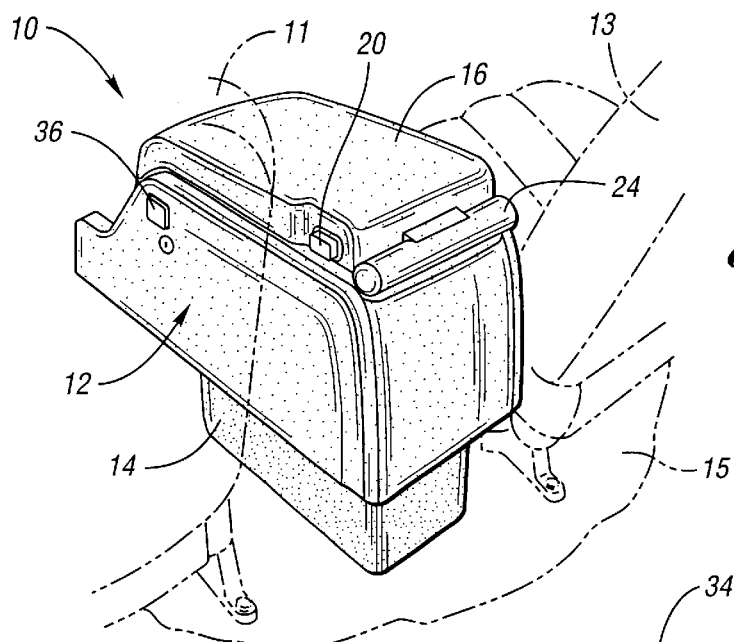
FIG. 1 is a perspective view of a first embodiment of a console assembly for a vehicle of the present invention.

Referring now to the Figures, a console assembly for a vehicle incorporating a video entertainment system in accordance with the present invention is disclosed. A first embodiment of the console assembly, shown in FIGS. 1–7, comprises a floor console assembly 10 disposed between a pair of passenger seats 11, 13 in the passenger compartment of the vehicle. In a preferred embodiment of the invention, floor console assembly 10 is disposed between the driver and passenger seats in the front passenger compartment of the vehicle. However, it is understood that the console assembly may also be positioned between a split passenger seat arrangement in the rear passenger compartment of the vehicle.

The floor console assembly 10 includes a console housing 12 having a base 14 configured to secure the console assembly 10 to the floor 15 of the passenger compartment of the vehicle. The console housing 12 may also include a variety of accessory components, such as storage bins or cup holders, on the forward or rear portions of the housing. An armrest 16 is pivotally connected to a storage compartment closeout section 18 by a hinge, and the armrest 16 and closeout section 18 are secured together by an armrest latch 20. A video monitor 22 is disposed beneath the armrest 16 in the closeout section 18 and is pivotally connected to the closeout section 18 by a monitor mounting arrangement illustrated by video monitor mount 24.

Figure 2:
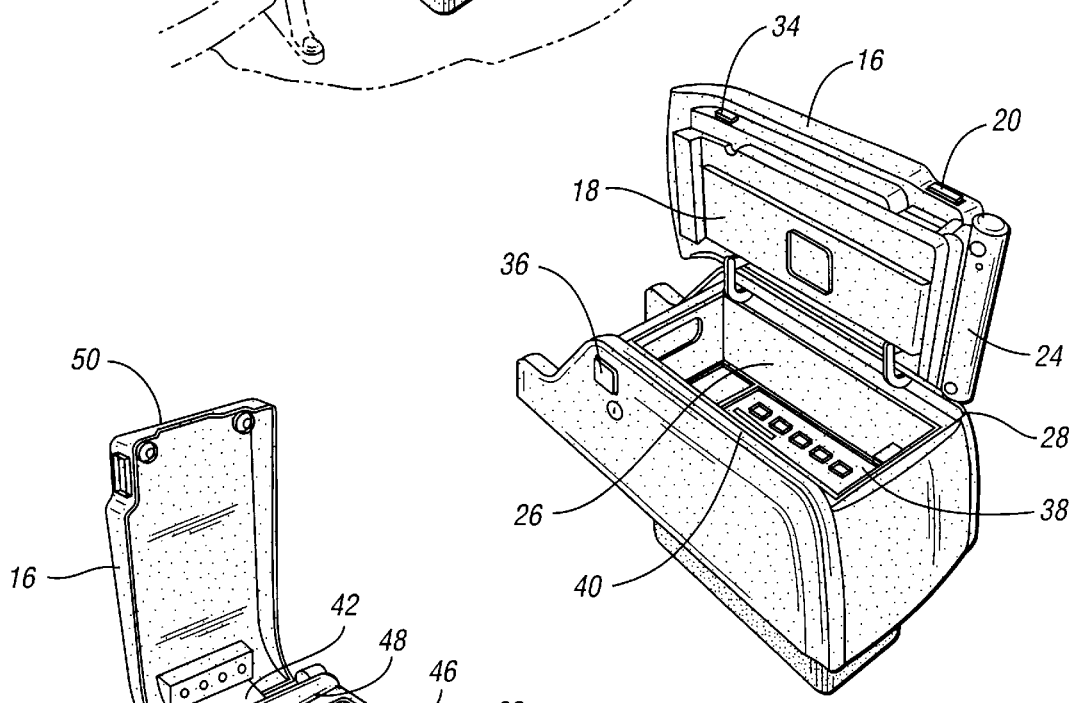
FIG. 2 is a perspective view of the console assembly with the armrest and storage area closeout pivoted upward to allow access to the console storage area.

FIGS. 1–4 show, sequentially, the movements required to position the video monitor 22 between a stored position and an upright or deployed position for viewing by rear seat passengers. FIG. 1 shows the console assembly 10 in the closed or stored position. In FIG. 2, the armrest 16 and storage compartment closeout section 18 are pivoted upward together, exposing an upwardly opening storage compartment cavity 26 in the console housing 12. In one embodiment of the invention, storage compartment closeout section 18 is connected to the console housing by a double bracket hinge 28. Alternatively, a pair of hinges disposed at pivot joints 30 connected closeout section to housing 12. It should also be understood that the armrest 16 and closeout section 18 can be easily arranged to pivot about the front, rear or sides of the console housing 12 based on design and aesthetic requirements.

The video monitor 22 is disposed within a cavity 32 formed in the closeout section 18 below the armrest 16. The video monitor 22 and monitor mount 24 pivot upward with the closeout section 18 to expose the storage compartment 26 when a latch 34 provided on the forward section of the closeout section 18 is released from a catch 36 formed in a side of the console housing 12. A video player 38, such as a DVD player, VCR or video game system, is preferably mounted within the storage compartment cavity 26 and is accessible through an opening 40 in a top portion or surface of the console housing 12. It may also be desirable to provide a video player, such as a DVD player, as an integral part of the monitor housing to allow easy loading and unloading of discs by the rear seat passengers.

Figure 3:
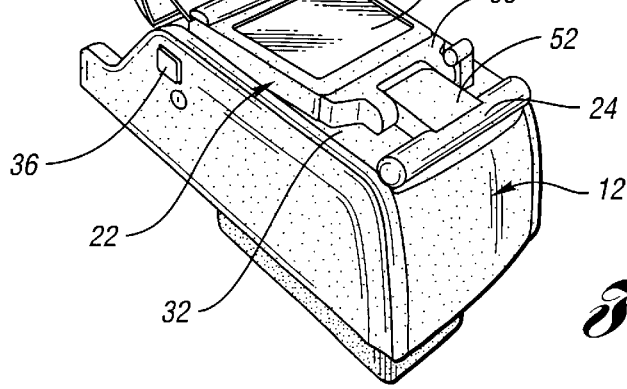
FIG. 3 is a perspective view of the console assembly with the armrest pivoted forward to allow access to a video monitor stored in a storage area closeout.

Video monitor 22 is shown in the stored position in FIG. 3. Closeout section 18 is secured adjacent the opening 40 in console housing 12 when latch 34 engages catch 36 on console housing 12. Armrest latch 20 is disengaged from a securement portion of closeout section 18, allowing armrest 16 to pivot upward about a hinge 42 provided on a forward edge of the closeout section 18. It should be understood that hinge 42 may be positioned on an alternative side of the closeout section 18 based on the placement of hinge 28 for attaching closeout section 18 to console housing 12. For example, the armrest may be hinged about a side surface of the closeout section if the closeout section is hinged about a rear surface of the console housing.

Cavity 32 in the top surface of the closeout section 18 receives the stored video monitor 22 and portions of the monitor mount 24. The cavity 32 cooperates with armrest 16 to protect video monitor screen 46 of video monitor 22 while disposed in the stored position shown in FIGS. 1–3. It may be desirable to provide the video monitor screen 46 with a liquid crystal display to enhance viewing from side angles. Additionally, ports 48 may be provided on a forward surface of the video monitor 22 to allow rear seat passengers to control at least one function of the video player or wireless headphones to link with either the video player or vehicle audio entertainment system via an infrared or radio frequency connection.

The video monitor 22 is finally pivoted to the deployed position, as shown in FIGS. 4 and 5. In this position, the video monitor 22 is pivoted rearward about monitor mount 24 from the cavity 32 in the closeout section 18 to a substantially vertical position to allow the monitor screen 46 to be viewed by rear seat passengers. The armrest 16 is pivoted about the forward hinge 42 to a closed position above the closeout section 18. An aperture 50 formed in a rear edge of the armrest 16 allows arm 52 of monitor mount 24 to extend into the upright position.

As is shown in FIGS. 5 and 6, closeout section 18 includes a cavity 54 formed in the top surface 56 of the closeout section 18 to receive a remote control 58. The remote control 58 sits in cavity 54 below the video monitor 22 when the monitor is deployed in the stored position in the closeout section 18. A cable (not shown) or other connection extends from the video monitor 22 through the closeout section 18 to the video player 38 to transmit signals from the player 38 to the monitor screen 46.

In a preferred embodiment of the invention, a microswitch (not shown) is disposed on at least one monitor mount hinge connecting monitor mount 24 to closeout section 18 to automatically shutoff the video monitor screen 46 when the video monitor 22 is pivoted downward past a preselected position. Alternatively, a detent projection 62 formed on the top surface 56 of the closeout section 18 may engage a switch provided on the rear surface of the monitor 22. When the detent 62 engages the switch, the monitor screen 46 is powered off if the video monitor 22 is powered on while being lowered to the stored position.

Referring now to FIG. 7, the video monitor mount 24 of a first embodiment of console assembly 10 includes a hinge member 64 having a hinge 66, and arm 52, which extends generally perpendicular to the hinge 66. A swivel mount 68 is pivotally connected to an upper portion 70 of arm 52. At least one detent is provided on opposing inner surfaces of the swivel mount 68 which cooperates with pins 76 on the upper portion 70 of the arm 52 to selectively adjust the vertical position of the video monitor screen 46.

In a preferred embodiment of the invention, a pair of detents 72, 74 are provided on the swivel mount 68 to secure the monitor 22 at a first position 90 degrees from horizontal and a second position at about 67 degrees from horizontal. It is desirable to position the monitor screen at about 67 degrees from horizontal to provide an optimal sight line for the video monitor screen 46 while reducing the potential of rear seat passengers developing motion sickness while viewing the monitor screen. A monitor base 78 includes an upper surface 80 receiving the video monitor screen 46 and a lower surface 82 rotatably mounted to an upper portion 84 of the swivel mount 68. The monitor base 78 rotates about the swivel mount to allow the video monitor screen 46 to rotate relative to the monitor mount 24. It is also understood that video monitor mount 24 may comprise a mounting arm which has a fixed arrangement which does not allow the video monitor 22 to pivot or rotate.

Figure 9:
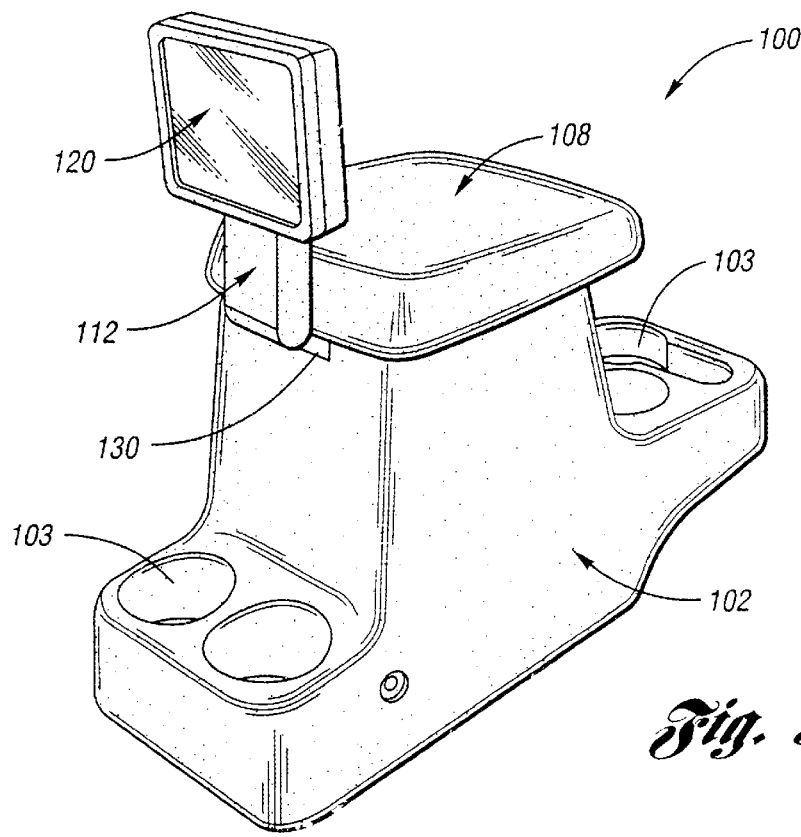
FIG. 9 is a perspective view of the console assembly with a video monitor shown in the deployed position.

FIGS. 8–9 show perspective views of a second embodiment 100 of a console assembly of the present invention. This embodiment functions similarly to the embodiment shown in FIGS. 1–7. The console assembly 100 includes a console housing 102 including a storage compartment cavity (not shown), cup holders 103 disposed on front and rear portions of the housing and a storage compartment closeout section 104 pivotally mounted to the console housing 102 at a hinge 106. An armrest 108 is pivotally connected to a forward edge of the closeout section 104 at hinge 110.

An L-shaped video monitor mount 112 includes a lower end 114 hingedly connected to a rear portion 116 of the closeout section 104. A plurality of video input ports 118 are provided on a side surface of the monitor mount 112. A video monitor 120 having a liquid crystal display screen 122 is pivotally mounted to a pivot joint 124 extending from an upper end 126 of the monitor mount 112. The monitor mount 112 is deployable between a stored position wherein the video monitor 120 is stored within a cavity 128 in the closeout section 104 and an upright viewing or deployed position. An infrared port can be disposed on either the L-shaped video monitor mount 112 or the video monitor 120.

In the upright position illustrated in FIG. 9, the monitor mount 112 extends through a passage 130 in a rear portion of the closeout section 104, allowing video monitor 120 to extend generally vertically above the console assembly 100.

In an alternative embodiment of the invention, closeout section 104 and armrest 108 are slidably positioned between a first position disposed above the console housing 102 and a second position wherein the closeout 104 and armrest 108 are positioned forward of the console housing 102.

Figure 10:
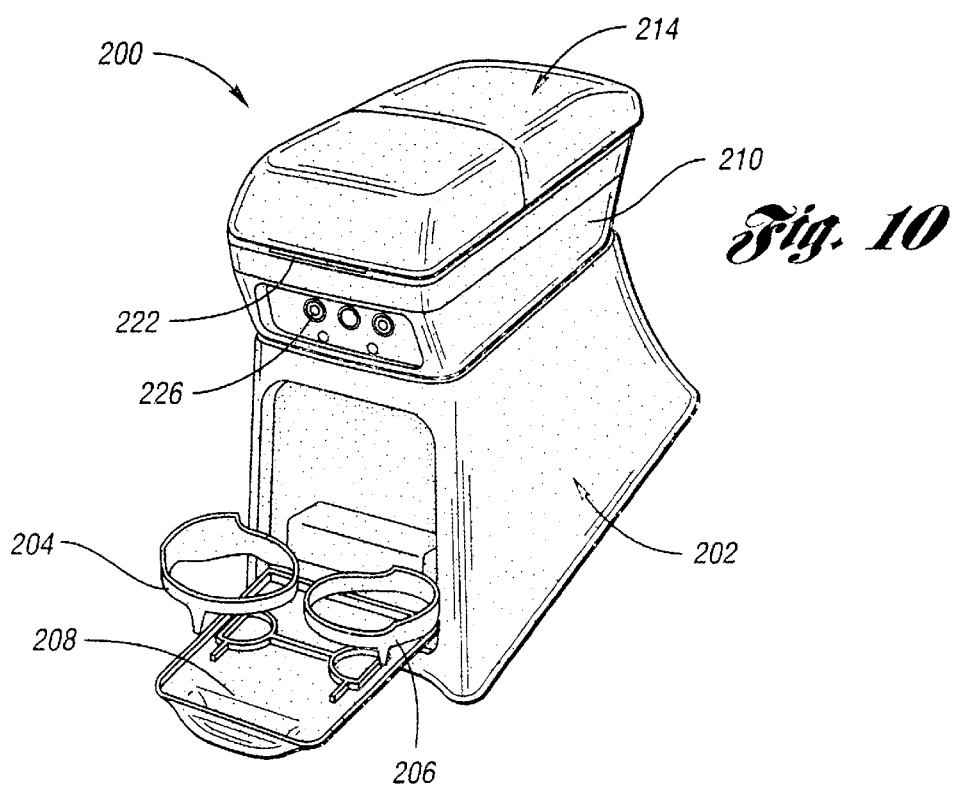
FIG. 10 is a perspective view of a third embodiment of the console assembly of the present invention.

Referring to FIGS. 10–12, a third embodiment 200 of the console assembly of the present invention is shown. The console assembly 200 includes a console housing 202 having a pair of cup holders 204, 206 stored behind a door 208 in the rear portion of the console housing 202. A storage compartment cavity (not shown) is formed within the console housing 202. A storage compartment closeout section 210 includes a storage cavity 212 formed in a top surface of the closeout section 210. The closeout section 210 is pivotally mounted to the console housing 202 above the storage compartment cavity. An armrest 214 secured to a forward portion 218 of the closeout section 210 by hinge 216 extends above the storage cavity 212.

Armrest 214 includes a rear portion 220 connected to the closeout section 210 at hinge 222 and a forward portion 218 pivotally connected to the rear portion 220. A video monitor 224 is stored on a bottom surface 225 of the forward portion 218 of armrest 214. To deploy the video monitor 224, a passenger pivots armrest 214 rearward about hinge 222, then rotates the forward portion 218 of the armrest 214 about the rear portion 220 to expose video monitor 224 to rear seat occupants. Input/output video port jacks 226 provided on a rear surface 228 of the closeout section 210 connect an auxiliary input, such as a video game system or the like, to the video monitor 224 or video player stored in the storage compartment cavity (not shown).

Figures 13, 14:
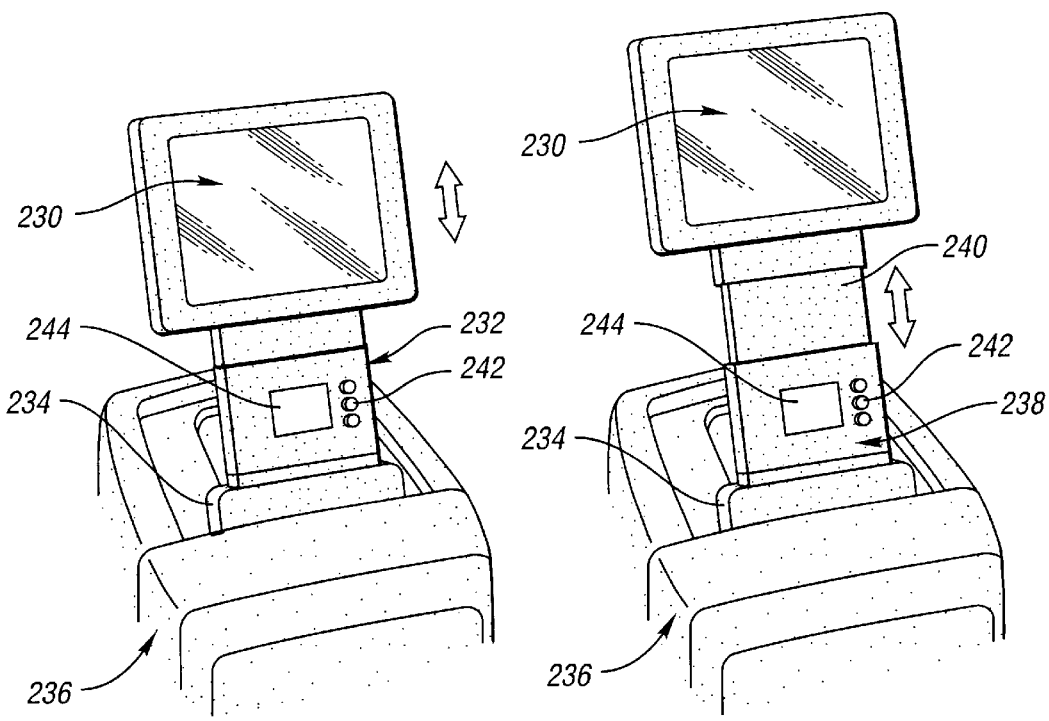
FIG. 13 is a perspective view of an alternative mounting arrangement for a video monitor in a console assembly showing a video monitor in a lowered position.
FIG. 14 is a perspective view of the alternative mounting arrangement showing the video monitor in a raised position.

FIGS. 13–16 illustrate various video monitor mounts and mounting arrangements for a console assembly in accordance with the present invention. It should be understood that any of the video monitor mounts illustrated in this application can be used with the console assemblies described herein. FIGS. 13 and 14 illustrate one video monitor mount, wherein a video monitor 230 is slidably mounted to a mounting arm 232 to position the video monitor 230 between a lowered or stored position and at least one raised or deployed position. Mounting arm 232 includes a lower section 234 pivotally mounted to a console housing 236, a control section 238 and an upper portion 240. Control section 238 includes audio/video input jacks 242 in communication with a video player (not shown) and the video monitor 230, and a port 244 to allow rear seat passengers to connect wireless headphones or control the video monitor 230 or video player with an infrared or radio frequency remote control.

Video monitor 230 is secured to the upper portion 240 of mounting arm 232. The video monitor mounting arrangement is shown in the lowered or stored position in FIG. 13. The upper portion 240 of the mounting arm 232 is disposed adjacent the control section 238, allowing the video monitor 230 and mounting arm 232 to be stored in console housing closeout cavity 246 when lowered to the stored position. As is shown in FIG. 14, the upper portion 240 of mounting arm 232 can be moved from the stored position adjacent control section 238 to at least one raised position to optimize the viewing area of the monitor 230. Preferably, at least one detent is provided along the mounting arm 232 to lock the upper portion 240 into any desired position.

Figure 15:
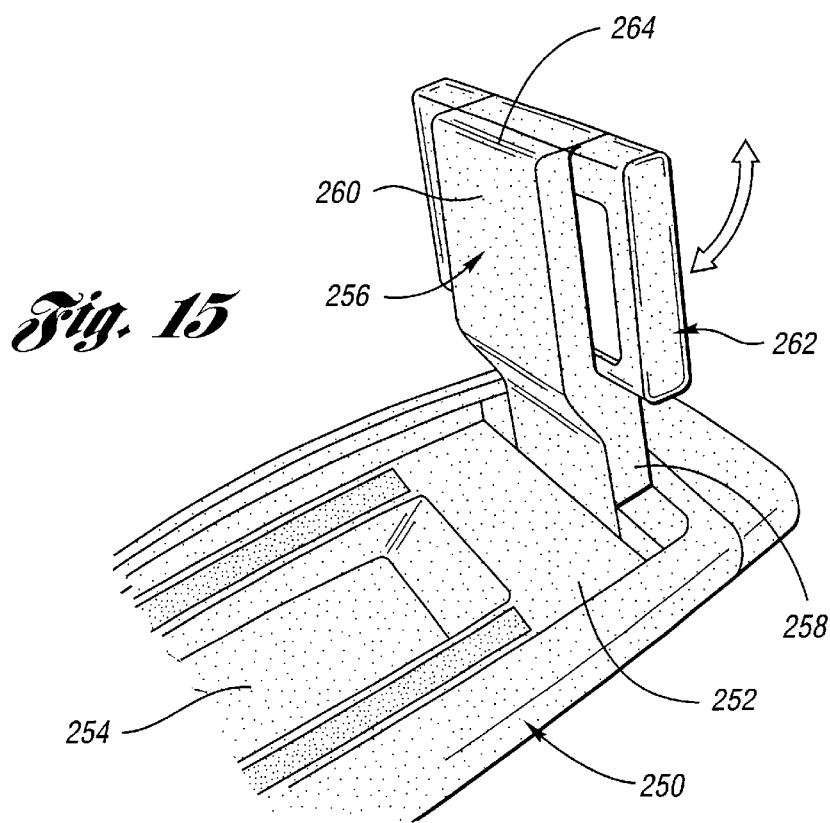
FIG. 15 is a perspective view of another alternative mounting arrangement for a video monitor in a console assembly showing a video monitor in a stored position.
Figure 16:
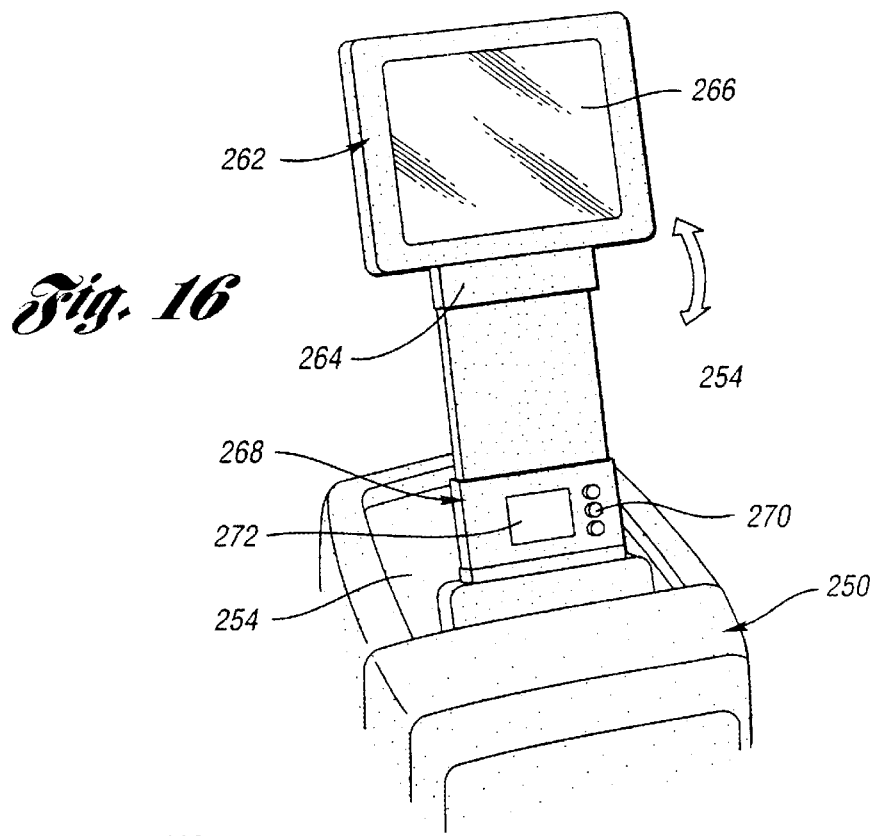
FIG. 16 is a perspective view showing the video monitor in a deployed position.

FIGS. 15 and 16 show a second alternative video monitor mount. As is shown in FIG. 15, a console assembly 250 includes a monitor storage area 252 having a cavity 254 formed therein. A lower portion 258 of video monitor mounting arm 256 is hingedly connected to the storage area 252 and includes an L-shaped monitor receiving portion 260. The mounting arm 256 is positionable between a stored position wherein the L-shaped receiving portion 260 is positioned within the cavity 254 in the storage area 252 and a raised position wherein the video monitor 262 is deployed such that the monitor screen 266 is oriented to face the rear seating passenger area.

As seen in FIG. 16, video monitor 262 is pivoted about a hinge at an upper portion 264 of the mounting arm 256 from the stored position, wherein the monitor screen 266 is adjacent the L-shaped receiving portion 260, to the deployed position. At least one detent is provided with the hinge to lock the monitor 262 in the deployed position. A control section 268 includes audio/video input jacks 270 in communication with a video player (not shown) and the video monitor 262 and a port 272 allowing rear seat passengers to connect wireless headphones or control the video monitor 262 and/or video player with an infrared or radio frequency remote control.

Figure 17:
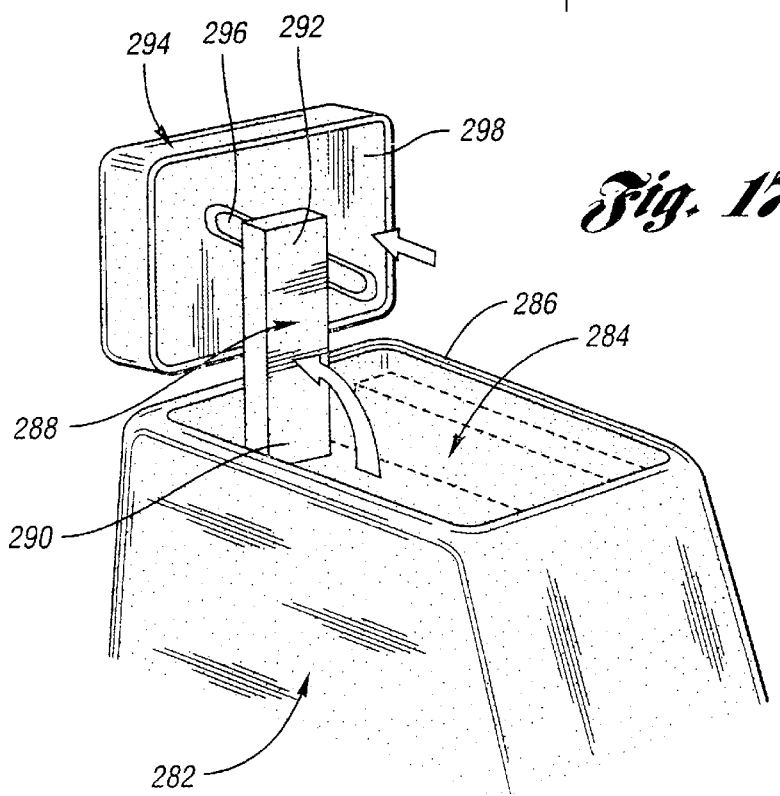
FIG. 17 is a perspective view of a fourth embodiment of a console assembly of the present invention.

Referring now to FIG. 17, a fourth embodiment 180 of the console assembly of the present invention is shown. The console assembly 280 includes a console housing 282 having a storage compartment cavity 284 formed therein. An armrest (not shown) is pivotally secured to the console housing 282 above an opening 286 in the top surface of the console housing 282 to cover the storage cavity 284.

A mounting arm 288 having a lower section 290 pivotally connected to an inner surface of the storage cavity 284 of console housing 282 and an upper section 292 that extends upward from the console housing 282. A video monitor 294 is rotatably mounted to the upper section 292 of the mounting arm 288. To store the video monitor 294 in cavity 284, the video monitor 294 is rotated 90 degrees about the upper section 292 of mounting arm 288 to place the video monitor 294 in a portrait orientation.

To deploy the video monitor 294 between a stored position and an upright or viewing position, the mounting arm 288 and video monitor 294 are pivoted rearward to place the video monitor 294 in position for viewing by rear seat passengers. The monitor 294 is translated 90 degrees about a pivot joint (not shown) on the upper section 292 of mounting arm 288 along a channel 296 formed on a rear surface 298 of video monitor 294 to position the monitor in a landscape orientation illustrated in FIG. 17. It should be understood that the mounting arm 288 and armrest (not shown) may also be mounted to a storage compartment closeout section that is pivotally connected to the console housing 282 adjacent storage cavity 284.

Referring now to FIGS. 18–23, a fifth embodiment 300 of the console assembly of the present invention is disclosed. The console assembly 300 comprises a center seat arrangement for a vehicle, and may, therefore, be referred to as a center seat console assembly. The console assembly 300 is disposed between a pair of passenger seats 302, 304 and includes a seat bottom 306 mounted to the vehicle floor 301 and a seat back 308. The seat back 308 is pivotally mounted to the seat bottom 306 between the passenger seats 302, 304 at hinges 309.

The seat back 308 includes a covered section 310 for supporting a passenger when the covered section 310 is in a raised position. An armrest 312 is pivotally connected to a storage compartment closeout section 316. The closeout section 316 is pivotally connected to the seat back 308 and is disposed above a storage compartment cavity 314 formed between the covered section 310 and closeout section 316 in seat back 308. The closeout section 316 includes a lower surface 318 extending above and across an opening 320 in the top surface of the seat back 308 adjacent the storage compartment 314. A video monitor 322 is disposed below the armrest 312 and is secured adjacent an upper surface 324 of the closeout section 316.

Figure 18:
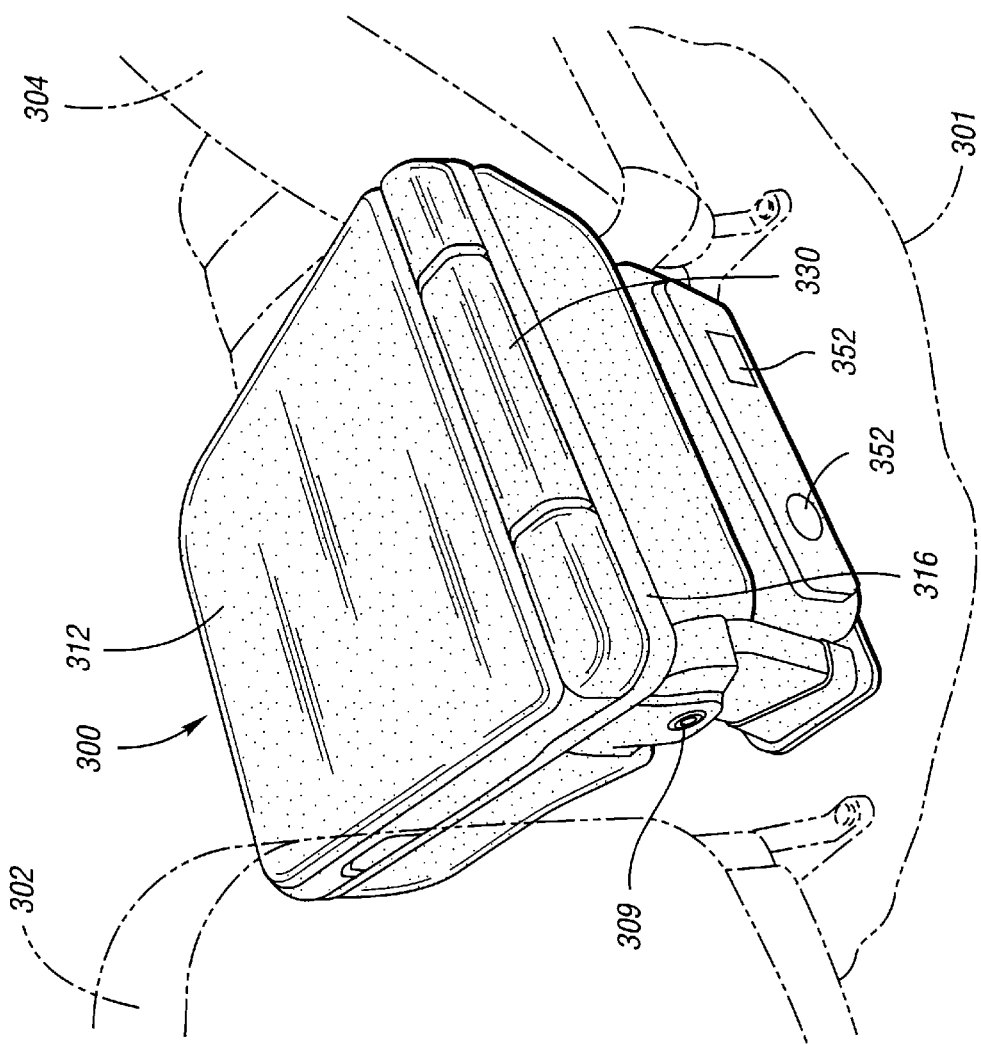
FIG. 18 is a fifth embodiment of a console assembly of the present invention.
Figure 19:
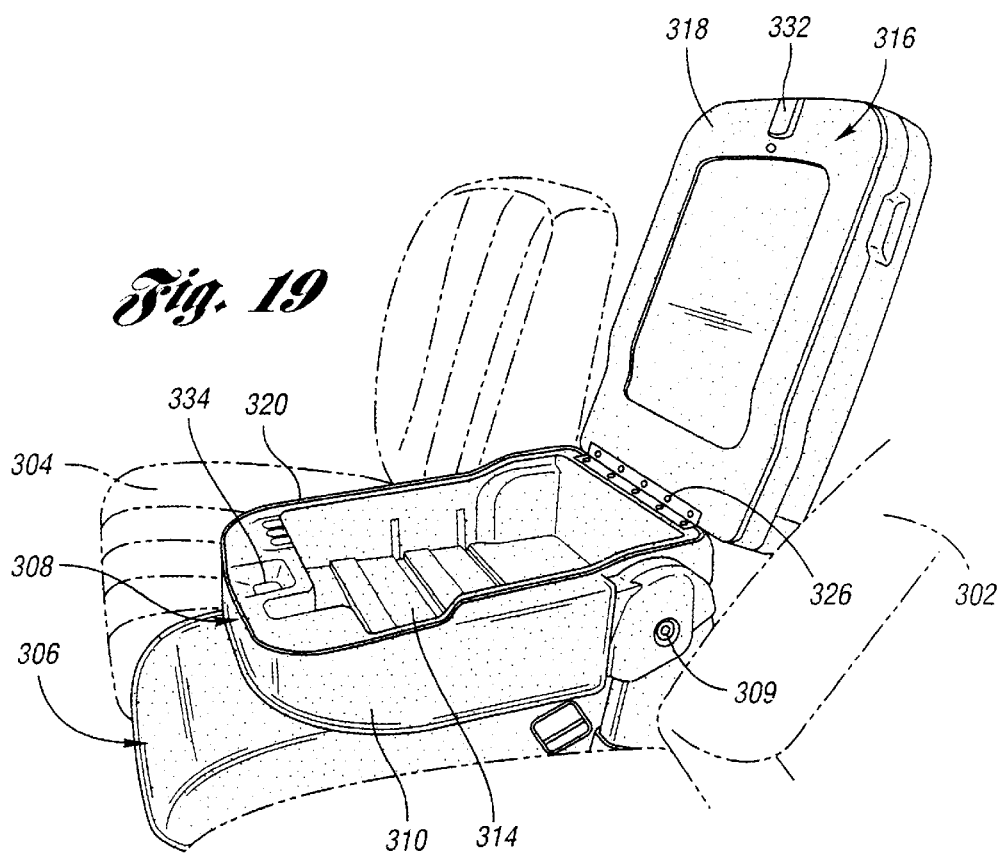
FIG. 19 is a perspective view of the console assembly showing the armrest and storage area closeout pivoted upward to expose the console seat back storage area.

FIG. 18 shows the console assembly 300 in the closed position with the seat back 308 folded down adjacent the seat bottom 306 to expose the armrest 312 and closeout section 316. In FIG. 19, the armrest 312 and closeout section 316 are pivoted rearward about a double bracket hinge 326, exposing the storage compartment 314 in the seat back 308. The closeout section 316 includes a latch 332 which engages a corresponding catch 334 on the covered section 310 to secure the armrest 312 and closeout section 316 to the seat back 308 adjacent the storage compartment cavity 314. As discussed earlier, the armrest 312 and closeout section 316 can be easily arranged to pivot about the front, rear or sides in view of design and aesthetic requirements.

Figure 20:
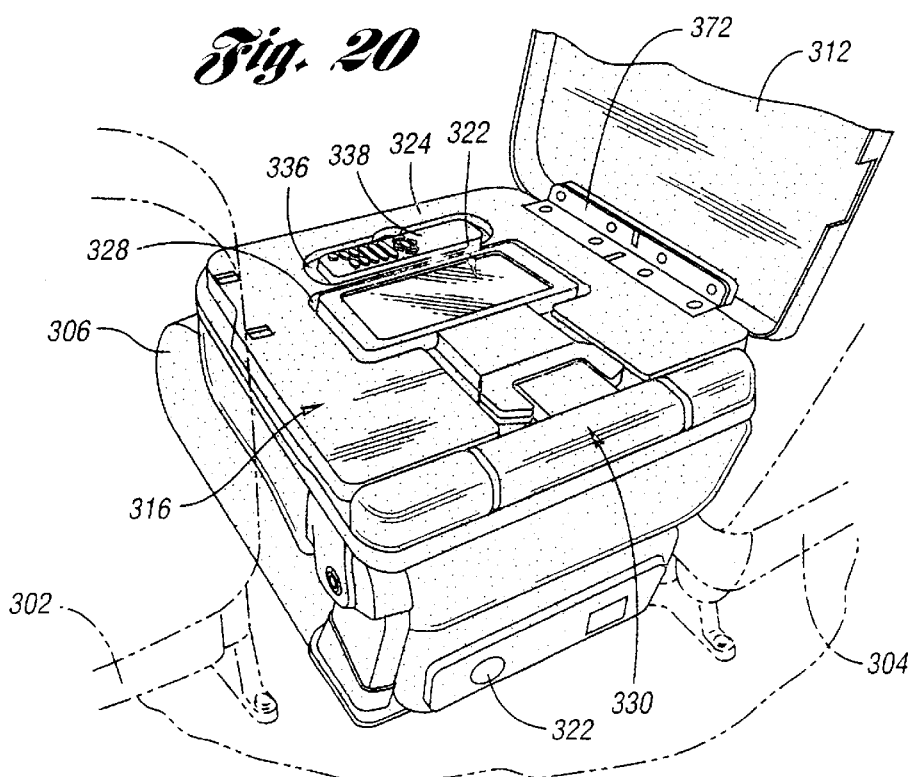
FIG. 20 is a perspective view showing the armrest pivoted upward to exposed a video monitor stored in the storage area closeout.

FIG. 20 illustrates the armrest 312 pivoted upward from the closeout section 316 about a hinge 327. A video monitor 322 is disposed within a cavity 328 formed in the upper surface 324 of closeout section 316 below the armrest 312. The video monitor 322 is secured to a monitor mount 330 which positions the video monitor between a stored position illustrated in FIG. 20 and a deployed position illustrated in FIG. 21. The monitor mount 330 is pivotally secured to a rear portion of the closeout portion 316. A cavity 336 provided in the upper surface 324 adjacent the video monitor 322 receives and stores a remote control 338 for operating the video system.

Figure 21:
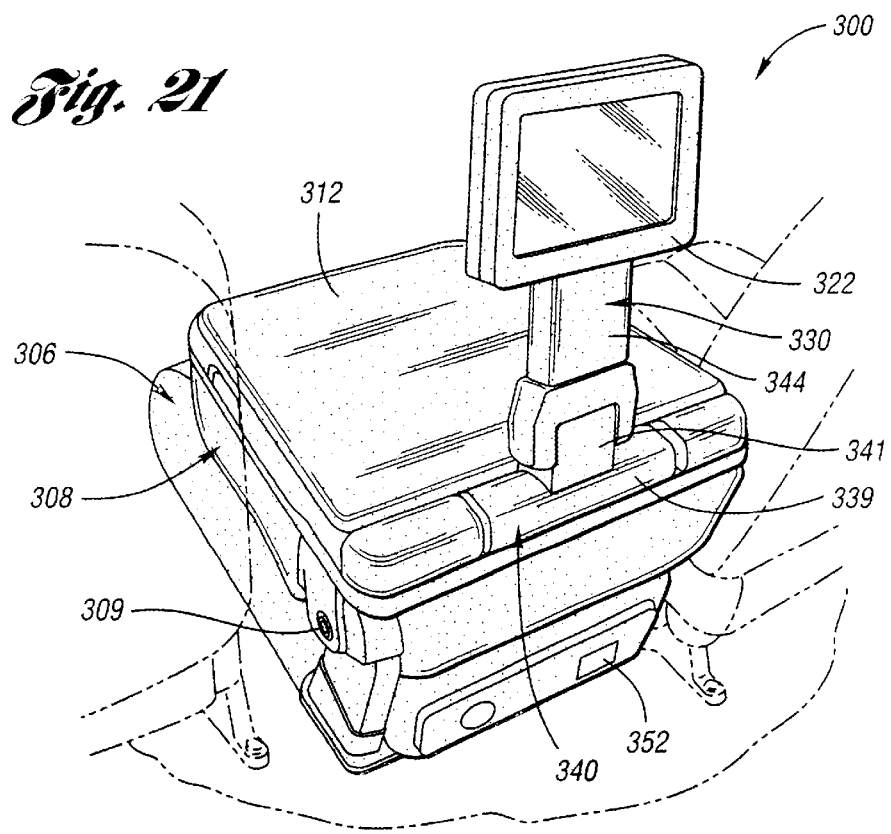
FIG. 21 is a perspective view showing the console assembly with the monitor in the deployed position.

FIG. 21 illustrates the video monitor 322 in the upright position. In this position, the video monitor 322 is pivoted rearward about video monitor mount 330 from the cavity 328 in the closeout section 316 to a substantially vertical or upright position viewable by rear seat passengers. The armrest 312 is pivoted downward to cover the closeout section 316. The video monitor mount 330 comprises a mounting arm 340 including a hinge member 340 having a hinge 339, and arm 341, which extends generally perpendicular to the hinge 339. An extension arm 342 pivotally secured to the arm 341 and a monitor base 344 rotatably mounted to the extension arm 342. The monitor base 344 receives the video monitor 322 and allows rotation of the video monitor 322 to a variety of positions. The extension arm 342 is selectively positionable to various angles to accommodate different passenger sight lines. It is understood that any of the video monitor mounts disclosed above may also be used with the console assembly 300 of the present invention.

Figure 22:
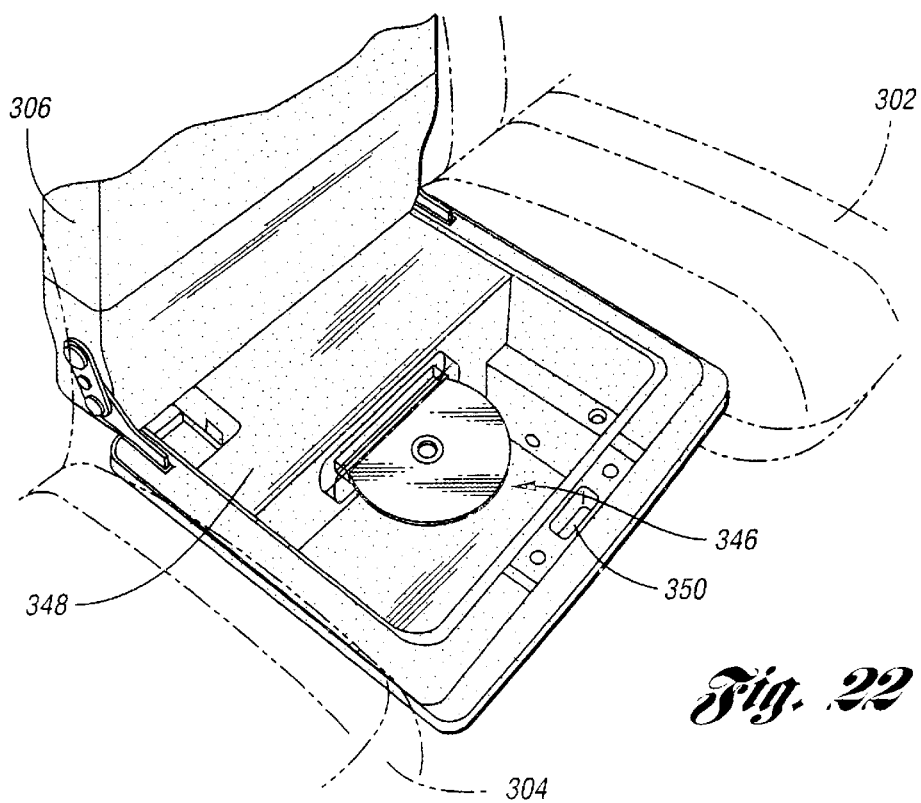
FIG. 22 is a perspective view showing the console seat bottom pivoted upward exposing the video player access area.

FIG. 22 illustrates a video player storage area 346 in accordance with the console assembly 300 of the present invention. Video player storage area 346 is disposed on the floor of the vehicle below in the seat bottom 306 and includes a video player 348, such as a DVD player, video player or the like. A catch 350 provided on storage area 346 is adapted to receive a latch (not shown) on the seat bottom 306 to secure the seat bottom 306 in position adjacent the opposing passenger seats. FIG. 23 shows audio/video input/output ports 352 in communication with the video player 348 in storage area 346. The input ports 352 allow rear seat passengers to either control the video player or connect alternative video components to the video monitor 322.

Figure 26:
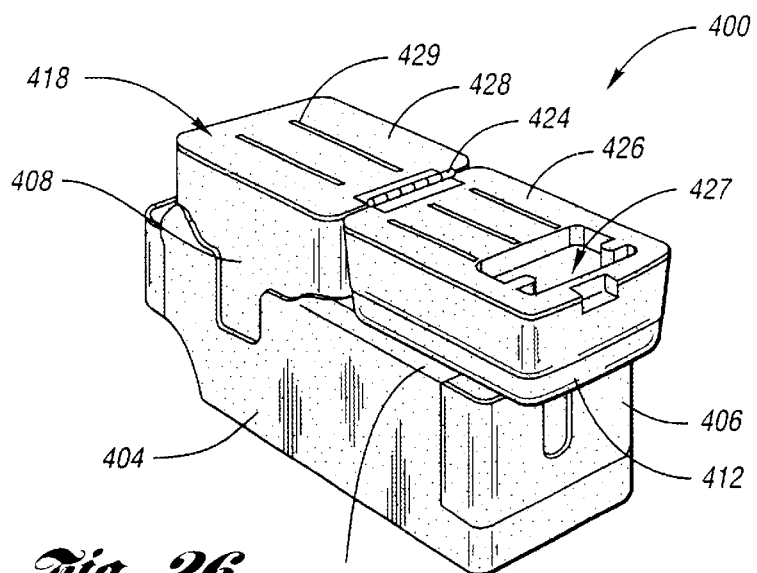
FIG. 26 is a perspective view of the floor console assembly showing the armrest pivoted forward exposing storage channels.

FIGS. 24–26 illustrate another embodiment 400 of the console assembly of the present invention. Console assembly 400 includes a console housing 402 having a base 404 configured to be secured to the floor of the passenger compartment. The console housing 402 includes a plurality of accessory compartments or bins 406 disposed on various side surfaces of the housing 402 to retain magazines, maps or the like. A storage compartment 408 extends upward from the base 404 and includes a cavity 410 for storing items. An armrest 412 is disposed above the storage compartment 410. The armrest 412 includes an upper covering 414, a handle 416 disposed on a forward surface and a lower surface 418.

A storage compartment closeout section 419 is pivotally connected to the storage compartment 408 by hinge 420. Closeout section 419 includes a first securement surface 426 having a rear portion connected to hinge 420 and a second securement surface 428 pivotally connected to the first securement surface 426 by a second hinge 424. A compartment 422 for storing tissues or the like is provided on a lower portion of the first securement surface 426. Armrest 412 is secured to an upper portion of the second securement surface 428.

As illustrated in FIG. 26, armrest 412 pivots forward about a hinge 424 to expose channels 427, 429 in the first and second securement surfaces 426, 428. In this arrangement, the upper covering 414 of armrest 412 rests against a forward portion 430 of the console housing 402. Channel 427 is provided in a lower portion of the second securement surface 428 to receive and retain the front forks of a bicycle to store the bicycle in the vehicle. A pair of channels 429 is provided in an upper portion of the first securement surface 426 which receive and retain inline skate blades or the like.

Figure 27:
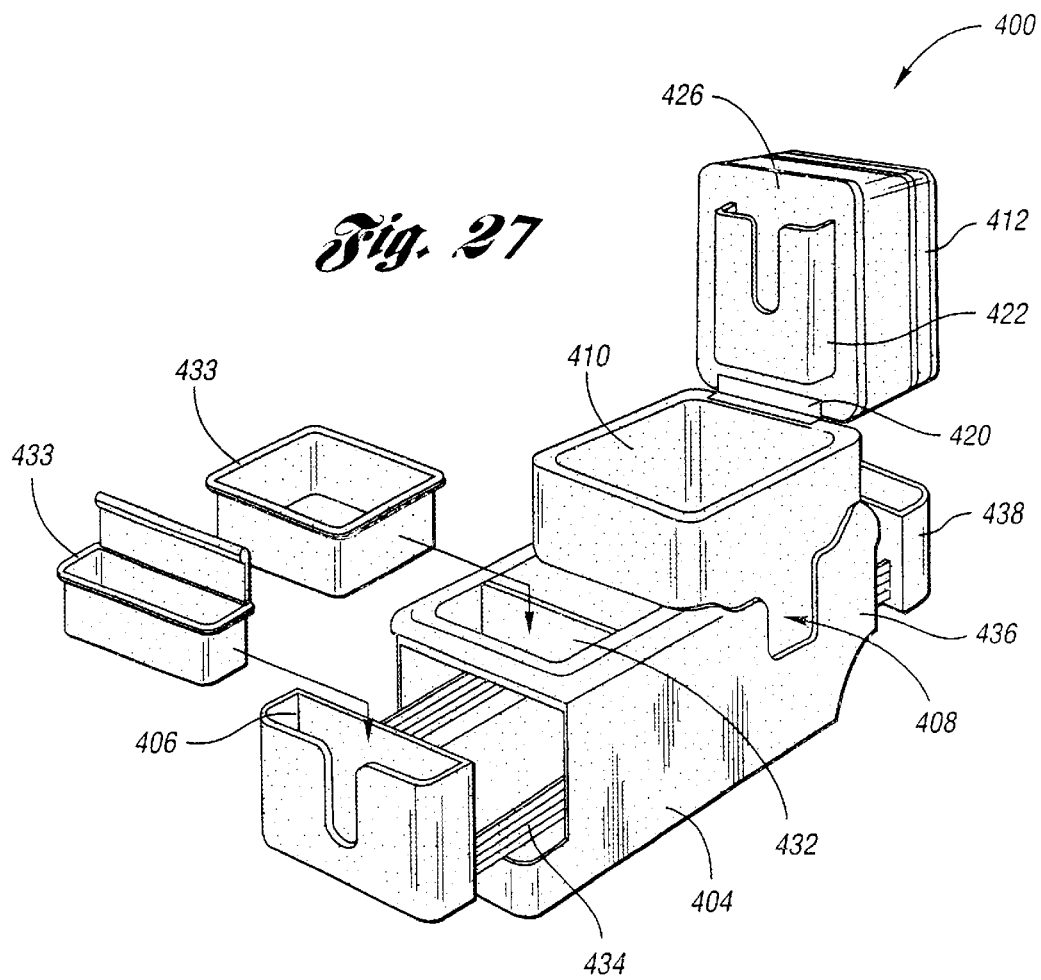
FIG. 27 is a perspective view of another floor console assembly in accordance with the present invention.

FIG. 27 illustrates an alternative embodiment of the console assembly 400. The forward portion 430 of the console assembly 400 includes a cavity 432 adapted to receive interchangeable modules or bins 433 therein. The bins 433 can be inserted in cavity 432 or, alternatively, in a slidable forward drawer 434 on the console housing 402. Additionally, the rear portion 436 of the console assembly 400 may include a slidable rear drawer 438 providing additional storage for the passenger compartment. As discussed earlier, this console can be provided between the front passenger seats in a vehicle, or alternatively, between split rear passenger seats in the rear of the passenger compartment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A console assembly for use with a passenger compartment of a vehicle comprising:
   a console housing adapted to be installed in the passenger compartment including a storage compartment;
   a storage compartment closeout section pivotally connected to the console housing and positionable between a raised position and a lowered position wherein a bottom surface of the closeout section at least partially covers the storage compartment, the closeout section having a top surface with a cavity;
   an armrest pivotally connected to the closeout section positionable between a closed position in which the armrest is positioned adjacent the closeout section and an open position;
   a video monitor mount having a lower portion pivotally connected to the closeout section and an upper portion; and
   a video monitor pivotally mounted to the upper portion of the monitor mount, wherein the video monitor is positionable between a stored position wherein the video monitor is disposed within the cavity in the closeout section and a deployed position wherein the video monitor is pivoted upward to a rearward facing position so that the video monitor is visible to rear seat occupants of the passenger compartment.

2. The console assembly of claim 1 wherein the console assembly comprises a floor console assembly having a console base securable to a floor of the passenger compartment of the vehicle between a pair of passenger seats.

3. The vehicle console assembly of claim 1 wherein the console assembly comprises a center seat console assembly disposed between a pair of passengers seats, the center seat console assembly having a seat bottom, a seat back pivotally connected to the seat bottom and a storage compartment formed within the seat back.

4. The console assembly of claim 1 wherein the video monitor mount comprises a hinge member pivotally mounted to a rear portion of the closeout section by a hinge, an arm extending upward from the hinge member, a swivel mount pivotally mounted to the arm and a monitor base rotatably mounted to the swivel mount.

5. The console assembly of claim 4 wherein the swivel mount includes at least one detent on opposing inner surfaces of the swivel mount cooperating with pins extending from an upper portion of the arm to secure the video monitor in at least one vertical positions.

6. The vehicle console assembly of claim 1 wherein the video monitor mount comprises an L-shaped mount having a lower end hingedly connected to a rear portion of the closeout section by a hinge and an upper end having a pivot joint extending upward to receive the video monitor.

7. The vehicle console assembly of claim 1 wherein the armrest has a rear portion hingedly connected to the closeout section and a forward portion rotatably connected to the rear portion including the video monitor secured to a bottom surface.

8. The vehicle console assembly of claim 1 wherein the video monitor mount comprises a mounting arm having a lower section pivotally mounted to the storage compartment and an upper section including a pivot joint operatively connected to a channel formed in a rear surface of the video monitor.

9. The vehicle console assembly of claim 1 wherein the video monitor mount comprises a mounting arm having a lower section pivotally mounted to the closeout section and an upper portion receiving the video monitor positionable on the mounting arm between at least a lowered position and a raised position.

10. The vehicle console assembly of claim 1 wherein the video monitor mount comprises a mounting arm having a lower portion hingedly connected to the closeout section, an L-shaped monitor receiving portion and an upper portion having the video monitor pivotally connected to and positionable between the stored position and the deployed position.

11. The console assembly of claim 1 wherein a video player is disposed within the storage compartment to transmit a signal to the video monitor for viewing by the rear seat occupants.

12. The console assembly of claim 1 wherein a control section is provided on the console assembly in communication with the video monitor and a video player to control at least one function of the video player and monitor.

13. The vehicle console assembly of claim 12 wherein the control section is provided on a portion of the video monitor mount below the video monitor.

14. The console assembly of claim 12 wherein a plurality of audio and video input ports are provided on the control section in communication with the video monitor to provide an auxiliary video input for the video player.

15. The console assembly of claim 12 wherein the control section comprises a control port provided on the video monitor and communicates with the video monitor and the video player to control at least one function of the video monitor or player by an infrared or radio frequency remote control.

16. A console assembly for use with a passenger compartment of a vehicle disposed between a pair of passenger seats, the console assembly comprising:
a console housing having a base securable to a floor of the passenger compartment such that the console housing is disposed between the pair of passenger seats, the console housing having a storage compartment;
a storage compartment closeout section pivotally connected to the console housing and positionable between a lowered position disposed at least partially adjacent the storage compartment and a raised position disposed away from the storage compartment, the closeout section having a top surface with a cavity;
an armrest pivotally connected to the closeout section positionable between a closed position in which the armrest is positioned adjacent the closeout section and an open position;
a video monitor mount having a hinge member pivotally mounted to a rear portion of the closeout section by a hinge, an arm extending upward from the hinge member, a swivel mount pivotally mounted to the arm and a monitor base rotatably mounted to the swivel mount; and
a video monitor disposed on the monitor base of the video monitor mount, wherein the video monitor is positionable between a stored position wherein the video monitor is disposed within the cavity of the closeout section and a deployed position wherein the video monitor is disposed in a rearward facing position so that the video monitor is visible to rear seat occupants of the passenger compartment of the vehicle.

17. The vehicle console assembly of claim 16 wherein the swivel mount includes at least one detent on opposing inner surfaces of the swivel mount cooperating with pins extending from an upper portion of the arm to secure the video monitor in at least one vertical position.

18. The vehicle console assembly of claim 16 wherein a video player is disposed within the storage compartment and transmits a signal to the video monitor for viewing by the rear seat occupants.

19. The vehicle floor console assembly of claim 16 wherein a control section is provided on the console assembly in communication with the video monitor and a video player to control at least one function of the video monitor and player.

20. The vehicle console assembly of claim 19 wherein a control port is provided on the video monitor to communicate with the video monitor and the video player to control at least one function of the video monitor or player by an infrared or radio frequency remote control.

21. The vehicle console assembly of claim 16 wherein a plurality of audio and video input ports are provided on the control section in communication with the video monitor to provide an auxiliary video input for a video player.

22. The vehicle console assembly of claim 16 wherein the console housing further comprises at least one sliding drawer disposed on a front or rear surface of the housing.

23. The vehicle console assembly of claim 22 wherein at least one interchangeable module is received within the at least one sliding drawer.

24. A console assembly for use with a passenger compartment of a vehicle comprising:
a console housing adapted to be installed on a floor of the passenger compartment between a pair of passenger seats, the console housing including a storage compartment;
a storage compartment closeout section pivotally connected to the console housing and positionable between a raised position and a lowered position, wherein a bottom surface of the closeout section at least partially covers the storage compartment, the closeout section having a top surface with a cavity;
an armrest pivotally connected to the closeout section positionable between a closed position in which the armrest is positioned adjacent the closeout section and an open position;
a video monitor mount having a lower portion pivotally connected to the closeout section and an upper portion;
a video monitor pivotally mounted to the upper portion of the video monitor mount, wherein the video monitor is positionable between a stored position wherein the video monitor is disposed within the cavity in the closeout section and a deployed position wherein the video monitor is pivoted upward to a rearward facing position so that the video monitor is visible to rear seat occupants of the passenger compartment;
a video player disposed within the console housing to transmit a signal to the video monitor for viewing by rear seat occupants; and
a control section provided on the console assembly in communication with the video monitor and player to control at least one function of the video player and monitor.

25. The console assembly of claim 24 wherein the video monitor mount comprises a hinge member pivotally mounted to a rear portion of the closeout section by a hinge, an arm extending upward from the hinge member, a swivel mount pivotally mounted to the arm and a monitor base rotatably mounted to the swivel mount.

26. The console assembly of claim 25 wherein the swivel mount includes at least one detent on opposing inner surfaces of the swivel mount cooperating with pins extending from an upper portion of the arm to secure the video monitor in at least one vertical position.

27. The console assembly of claim 24 wherein the control section further comprises one or more wireless control ports provided on an upper portion of the video monitor.

28. The console assembly of claim 27 wherein the one or more wireless control ports include infrared communication control ports.

29. The console assembly of claim 27 wherein the one or more wireless control ports include radio frequency communication control ports.

30. The console assembly of claim 24 wherein a plurality of audio and video input ports are provided on the control section in communication with the video monitor to provide an auxiliary video input for the video player.

* * * * *